United States Patent [19]

Ghosh

[11] Patent Number: 4,772,842
[45] Date of Patent: Sep. 20, 1988

[54] DRIVE ARRANGEMENT WITH A THREE-PHASE MOTOR

[75] Inventor: Shyamal-Krishna Ghosh, Bad Neustadt, Fed. Rep. of Germany

[73] Assignee: Siemens Aktiengesellschaft, Munich, Fed. Rep. of Germany

[21] Appl. No.: 23,133

[22] Filed: Mar. 9, 1987

[30] Foreign Application Priority Data

Mar. 25, 1986 [DE] Fed. Rep. of Germany ....... 3610097

[51] Int. Cl.⁴ .............................................. H02P 1/26
[52] U.S. Cl. ..................................... 318/778; 318/797
[58] Field of Search ............... 318/771, 778, 226, 773, 318/774, 775, 798, 797, 788; 310/184, 198, 140

[56] References Cited

U.S. PATENT DOCUMENTS

| | | | |
|---|---|---|---|
| 2,182,646 | 7/1938 | Shutt | 318/771 |
| 3,949,254 | 4/1976 | Woll, et al. | 310/198 |
| 4,035,701 | 7/1977 | Jensen | 318/771 |
| 4,352,051 | 9/1982 | Johnson | 318/790 |
| 4,387,330 | 6/1983 | Zigler | 318/788 |
| 4,417,192 | 11/1983 | Ghosh | 318/797 |
| 4,446,415 | 5/1984 | Taylor et al. | 318/771 |
| 4,675,591 | 6/1987 | Pleiss | 318/771 |

FOREIGN PATENT DOCUMENTS

| | | | |
|---|---|---|---|
| 1021945 | 1/1958 | Fed. Rep. of Germany | 15/235.4 |
| 547021 | 11/1922 | France | 140/123.5 |
| 2191323 | 6/1972 | France | 37/231 |
| 2262431 | 2/1975 | France | 260/544 Y |
| 0806948 | 2/1956 | United Kingdom | 318/771 |

OTHER PUBLICATIONS

Anlaufschaltungen bei Asynchron-und Synchronmaschinen ohne Stromunterbrechung by V. J. Tittel, The German Magazine E&M, 1961, pp. 163-170.
Japanese Abstract 54-129306, Hitachi Seisakusho Three Phase Induction Motors.
Jap. Abs. 56-110484, Shinko Denki, Delta Double-Star Starting Method for 3 Phase Squirrel Cage Indust. Mtr.

*Primary Examiner*—William M. Shoop, Jr.
*Assistant Examiner*—Brian K. Young
*Attorney, Agent, or Firm*—Kenyon & Kenyon

[57] ABSTRACT

A substantial reduction in required startup current is obtained in a drive arrangement with a three phase motor in that the stator winding of the motor comprises more than two winding legs per phase, all the winding legs of one phase being arranged in identical slots. During running up to speed of the motor, the more than two winding legs of each phase are wired symmetrically and are connected to the network in such a way that the magnetic fields produced by at least two winding legs per phase cancel each other out and only the remaining winding legs produce a rotating field.

5 Claims, 3 Drawing Sheets

DRIVE ARRANGEMENT WITH A THREE-PHASE MOTOR

BACKGROUND OF THE INVENTION

The present invention relates to the field of designing drive arrangements for driving three-phase motors whose winding legs are switchably connectable for efficient start-up.

A drive arrangement is known from "Drive Arrangement for Asynchronous and Synchronous Machines Without Phase Interruption," by Titel, *Elektrotechnik und Maschinenbau*, 1961, pages 163 to 170 having two winding legs per phase switchably connectable for efficient start-up. For the initial running up to speed of the motor, one winding leg of one phase is connected together with one winding leg of another phase for torque generation and connected to a supply system by means of a first switch, and, after the initial running up to speed, the winding legs are separately connected to the supply system by means of an second switch.

Further, after the running up to the speed, by the closing of the second switch, the winding legs are connected to the supply system in such a way that a double delta connection results, that is, one pair of winding legs of one delta connection is connected to the supply system, and so are one pair of winding legs of the other delta connection. Both delta connections of the winding legs are then in parallel on the supply system or network. With such a drive arrangement, a reduction of the startup current requirement to barely sixty percent of the startup current in direct startup is possible.

SUMMARY OF THE INVENTION

According to the present invention, the prior art drive arrangement can be improved upon to achieve far greater reduction in start-up current in that the stator winding comprises more than two winding legs per phase, all winding legs of a phase being arranged in the same slots of the stator, and that, during running up to speed, the winding legs of each phase are wired symmetrically and connected to the network in such a way that the magnetic fields produced by at least two winding legs per phase cancel each other out and only the other winding legs produce a rotating field.

Only the winding legs producing the rotating field contribute to torque formation. As these winding legs are distributed uniformly over the stator circumference, a symmetrical rotating field results. The other winding legs act only as ohmic resistance during the startup phase, since the magnetic fields produced by them cancel each other out, and consequently assume the function of providing a startup resistance during the startup phase.

In accordance with a further embodiment of the present invention, the winding legs can be wired so that after running up to speed, one winding leg of one phase is Y-connected with a winding leg of the two other phases and is also connected to the network. Thus this embodiment with three winding legs per phase operates, after the initial running up to speed, in a triple Y-connection.

In an alternative wiring arrangement of the winding legs after the initial running up to speed, a triple delta connection of the winding legs is achieved.

By appropriate selection of different wire cross-sections for the various winding legs and/or different numbers of turns, the startup current can be adapted to the respective need.

In the following, detailed description of the present invention, the subject of the application will be described more specifically with reference to an embodiment illustrated in the drawings.

DETAILED DESCRIPTION

Figure 1:
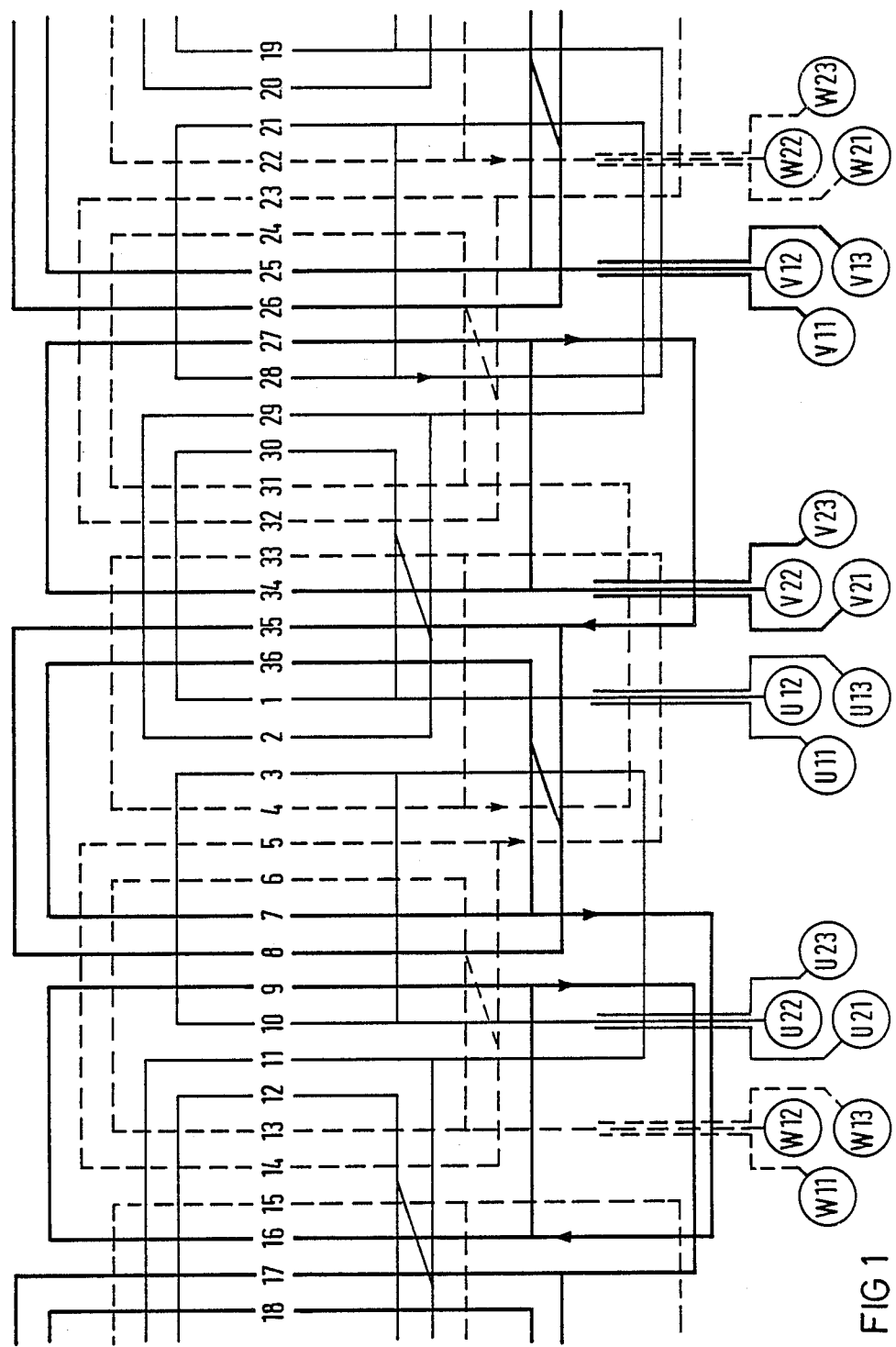
FIG. 1 is a winding scheme of the drive motor of a drive arrangement in accordance with the present invention.
Figure 2:
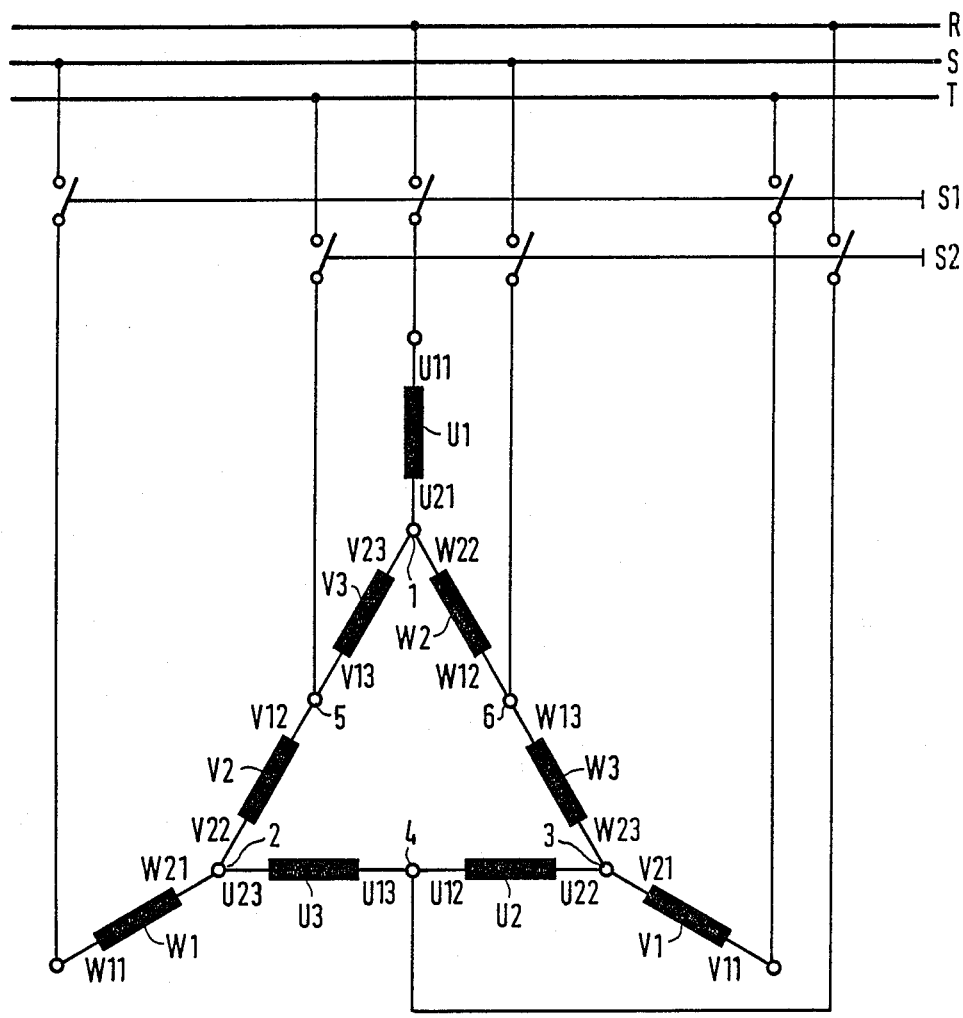
FIG. 2 is a wiring diagram of a drive arrangement in which, after an initial running up to speed, the motor is operated in triple Y-connection.
Figure 3:
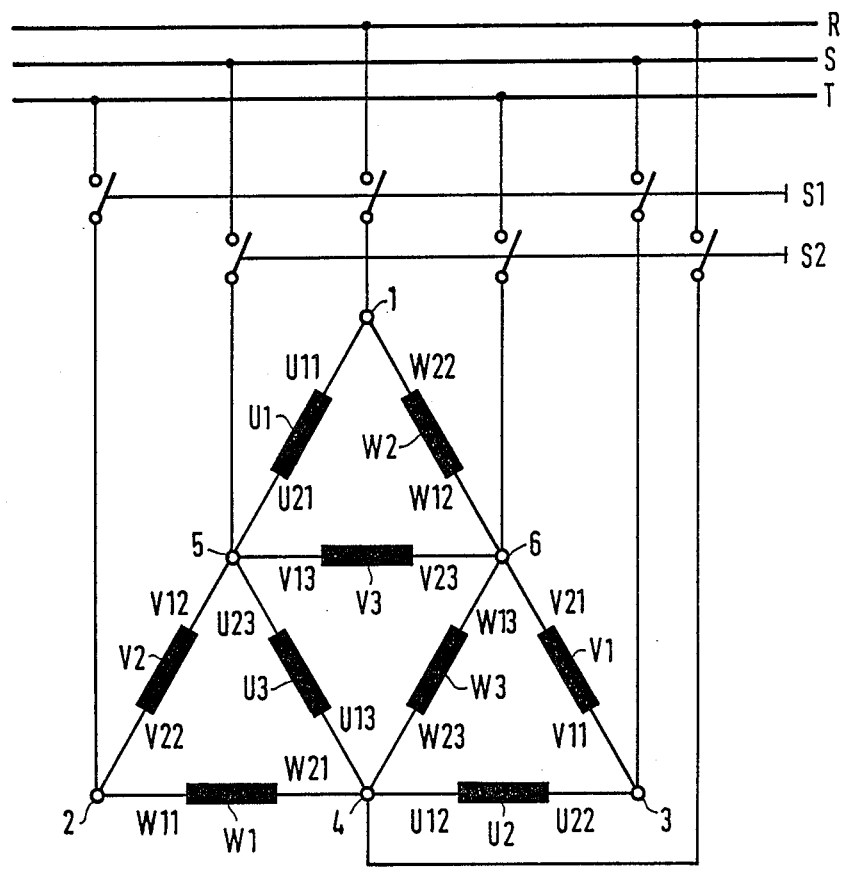
FIG. 3 is a wiring diagram of a drive arrangement in which, after running up to speed, the motor is operated in triple delta connection.

Similar reference characters are used in FIGS. 1, 2 and 3 to denote identical elements. As can be seen from the winding schematic diagram of FIG. 1, each phase of the stator winding consists of three winding legs. Belonging to phase U are the winding legs U1, U2, U3, to phase V the winding legs V1, V2, V3, and to phase W the winding legs W1, W2, W3. In FIGS. 1, 2, 3 are shown the beginning and ends of the winding legs U1, U2, and U3 and a particular designation scheme has been established for identifying these leads. For example, these leads comprise the designation U11,U12,U13,W22,W23 where the first letter denotes the phase. The first digit of the two digit index after the letter denotes either the beginning 1 or the end 2 of the winding leg. The second digit of the two digit index denotes whether it is the first, second, or third winding leg of the phase U,V or W. For example, the designation W11 is the lead to the beginning of winding leg W1 and W21 is the lead ending winding leg W1.

The winding legs belonging to one phase are wound parallel in the same slots of the stator; this is indicated in FIG. 1 by the triple drawing strokes at the beginning and end of each winding leg. The beginning and the end of each winding leg are brought out, so that the wiring of the individual winding legs necessary for the startup and operation of the motor can be switchably controlled.

In the circuit variant of a drive arrangement illustrated in FIG. 2, pairs of winding legs U2,U3;V2,V3; and W2,W3; respectively, comprising the second and third winding legs of a phase are oppositely connected in series, and these series connections are then delta-connected, doing so according to the desired direction of rotation of the three phase motor. Oppositely connected in series means that the beginnings U12,U13;V12,V13 and W12,W13, respectively, of the second and third winding legs U2 and U3, V2 and V3, W2 and W3 which belong to a phase and which form one side of the delta connection are connected together. The ends U22,U23;V22, V23 and W22,W23, respectively, of these winding legs are connected with the ends U21,V21,W21 of a first winding leg respectively belonging to an adjacent phase. As shown in FIG. 2, the ends V23 and W22 are connected to the first corner 1, the ends V22 and U23 to the second corner 2, and the ends U22 and W23 to the third corner 3 of the delta connection.

The third winding legs U1, V1, W1 of the individual phases U, V, W are each connected by their winding leg ends U21, V21, W21 to one of the corners 1, 2, 3 of the delta connection, so that, at each corner 1, 2, 3, the ends of one winding leg of each phase U, V, W are connected together. Hence in corner 1 are coupled the winding leg ends U21, V23 and W22; in corner 2, the winding ends U23, V22 and W21; and in corner 3, the winding ends U22, V21 and W23. The free winding ends U11, V11 and W11 of the winding legs U1, V1 and W1 not belonging to the delta are connectable to the network phases R, S, T by means of a first switch S1. The common junctions 4, 5 and 6 are of the second and third winding legs U2, U3; V2, V3; and W2, W3, respectively, lying in the sides of the delta, are likewise connectable to the network phases by means of an additional switch S2, said additional switch S2 being closed later than switch S1 after the motor has run up to speed. The two switches S1 and S2 are connected to the winding legs and to the network phases R, S, T in such a way that the winding legs U1, U2, U3 and V1, V2, and V3 and W1, W2, W3, respectively, belonging to a phase U, V, W are connected to the same network phase R, S, T, respectively. According to the embodiment shown in FIG. 2, the winding legs U1, U2, U3 belonging to phase U are connected to phase R, the winding legs V1, V2, V3 belonging to phase V are connected to phase T, and the winding legs W1, W2 and W3 belonging to phase W are connected to the network phase S.

For startup of the three phase motor of the drive arrangement, the first switch S1, for example, is closed. Thus, only the winding beginnings U11, V11 and W11 are live. Consequently, current flows only in one direction in the sides of the delta connection. "(Since the winding legs U2 and U3, V2 and V3, W2 and W3 respectively, each lying in one side of the delta are oppositely series-connected, the magnetic fields produced in these winding legs does not contribute to the torque formation. Instead, during the startup phase, these second and third winding leg pairs act only as ohmic resistance, by which the startup current is greatly reduced. (The startup moment is produced solely by the winding legs U1, V1 and W1 connected between the one switch S1 and the corners 1,2 and 3 of the delta connection. As these winding legs are distributed uniformly over the stator circumference of the three-phase motor, a symmetrical rotating field results.)"

After running up to speed, additional switch S2 is closed. The junctions 4,5,6 of the pairs of winding legs comprising the sides of the delta connection are connected to the supply system. In this manner, a triple Y connection results to the supply system.

The circuit according to FIG. 3 is designed so that after the motor has run up to speed, all winding legs are in triple delta connection to the phases R,S,T of the supply system after both first switch S1 and additional switch S2 are closed. For this purpose, the individual winding legs are connected so that, firstly, one winding leg of one phase is unidirectionally series-connected with a winding leg of another phase, and these series connections are, in turn, in delta connection in such a way that a rotation field results in the desired direction of rotation of the motor. Undirectional series-connection means in this contex that the common junction 4,5,6, respectively, of two winding legs comprising one side of the delta connection connect the beginning of one winding leg to the end of the other winding leg.

According to the wiring diagram shown in FIG. 3, in each of the sides of the delta connection, the winding legs U1 and V2, W1 and U2, V1 and W2, respectively, are connected in series. The remaining third winding legs U3, V3, W3 of the individual phases U, V, W connect the common junctions 4,5,6, in such a way that between two particular junctions, for example, junctions 5 and 6, and the opposite corner, for example, corner 1 of the delta connection, a delta connection consisting of a winding leg of each of the three phases U,V,W is formed.

Since at corner 1 the legs U1 and W2 belongig to the phases U and W are connected together, the winding leg V3 belonging to phase V is accordingly connected between the junctions 5 and 6. In corner 2, the legs V2 and W1 are joined, so that between junctions 5 and 4 leg U3 of phase U must be connected. Lastly, between junctions 4 and 6, leg W3 is connected, which connects together the two legs V1 and U2 brought together in corner 3, at their other winding ends V21 and U12.

During motor startup at first only the first switch S1 is closed, through which the corners 1,2,3 are connected to the phases R,S,T of the supply system. By the above-described symmetrical wiring of the winding legs, the torque-forming effect of pairs of winding legs belonging to one phase is cancelled, that is, the torque will always only be created during running up to speed by one winding leg of each phase.

After the motor has run up to speed, the additional switch S2 is closed, thereby causing the connection of the junctions 4, 5 and 6 to the network phases R, S, T. The two switches are connected to the corners 1, 2 and 3 and to the junctions 4, 5 and 6 as well as to the network phases R, S, T in such a way that after speed has been attained, the beginnings U11, U12, U13 and V11, V12, V13 and W11, W12, W13, respectively, of the winding legs belonging to the individual phases U, V, W are connected to the same network phase R, S, T, respectively. Hence the winding beginning U11 is connected to the network phase R via the one switch S1, while the winding beginnings U12 and U13 are so connected via the additional switch S2. In the same manner the winding beginnings V11 and W11, respectively, are connected via the first switch S1; and the winding beginnings V12, V13 and W12, W13, respectively, via the additional switch S2, to the network phase S or T, respectively.

In this manner, the deltas formed between a corner and two junctions from each winding leg U1, V3, W2; respectively V2, W1, U3 or respectively U2, V1, W3 of the three phases U, V, W are connected to the network in parallel. In operation, this constitutes a triple delta connection.

By appropriate selection of the wire-cross-sections and/or the number of turns of the winding legs, the startup current can, within certain limits, be adapted to the respective need.

What is claimed is:

1. A drive arrangement with a three phase motor having a stator with slots therein comprising:
    (a) stator winding having, for each phase, more than two winding legs, all winding legs for the same phase disposed in the same slots of the stator, each winding leg having a first end and a second end;
    (b) said winding legs connected together by means of said first and second ends in a symmetrical manner;
    (c) a first switch for connecting said stator windings for each phase to a three phase supply system during start-up;
    (d) the connection of said winding legs together being such that, when connected to the supply system by said first switch, the magnetic fields produced by at least two winding legs in each phase cancel each other out with the remaining legs in each phase producing a rotating field of torque generation; and (e) a second switch for connecting said phase windings to the three phase supply stream after running up to speed such as to establish, with said first switch, a separate connection of each winding leg of each phase to the supply system.

2. The drive arrangement of claim 1 comprising a first, a second, and a third winding leg per phase, the second and third winding leg of each phase being oppositely connected in series and said pairs of series connected second and third winding legs being in delta connection, the first winding leg of each phase having a first end connected to the first switch and a second end connected to the corner of the delta connection at which the winding legs of the other two phases are connected, the junctions at the respective series connections of the second and third winding legs of each respective phase being connected to the second switch, the first or second switch being closed during starting, both switches being closed after starting.

3. The drive arrangement of claim 1 comprising a first, a second and a third winding leg per phase, the first and second winding legs of each phase being unidirectionally connected in series with a winding leg of another phase in such a way that the first winding leg of the one phase is connected to the second winding leg of one of the other phases, the series connection of the first and second winding legs thus formed being connected in delta in such a way that the phase sequence of the series connected winding legs is retained in the delta connection, the third winding leg of each phase being connected in the same phase sequence between the common junction of the first and second winding legs of the other respective phases, during starting the corners of the delta connection being connected by a first switch to a supply system and after starting said common junctions being connected by a second switch to the supply system in such a manner that a triple delta connection is obtained.

4. The drive arrangement according to claim 1, wherin at least one of the winding legs of the same phase has a different operating cross section as compared with the remaining winding legs of the same phase.

5. The drive arrangement according to claim 1, wherein at least one of the winding legs of the same phase has a different number of turns as compared with the remaining winding legs of the same phase.

* * * * *